United States Patent
Myara et al.

(10) Patent No.: US 11,100,568 B2
(45) Date of Patent: Aug. 24, 2021

(54) SYSTEM AND METHOD FOR CREATING AND ANALYZING A LOW-DIMENSIONAL REPRESENTATION OF WEBPAGE SEQUENCES

(71) Applicant: PAYPAL, INC., San Jose, CA (US)

(72) Inventors: Benjamin Hillel Myara, Tel Aviv (IL); David Tolpin, Ashdod (IL)

(73) Assignee: PAYPAL, INC., San Jose, CA (US)

(*) Notice: Subject to any disclaimer, the term of this patent is extended or adjusted under 35 U.S.C. 154(b) by 334 days.

(21) Appl. No.: 15/852,331

(22) Filed: Dec. 22, 2017

(65) Prior Publication Data
US 2019/0199741 A1 Jun. 27, 2019

(51) Int. Cl.
| | | |
|---|---|---|
| G06Q 30/00 | (2012.01) |
| G06Q 30/06 | (2012.01) |
| H04L 29/06 | (2006.01) |
| H04L 29/08 | (2006.01) |
| G06F 40/30 | (2020.01) |
| G06Q 30/02 | (2012.01) |

(52) U.S. Cl.
CPC ........ *G06Q 30/0641* (2013.01); *G06F 40/30* (2020.01); *G06Q 30/0204* (2013.01); *G06Q 30/0251* (2013.01); *G06Q 30/0601* (2013.01); *H04L 63/1425* (2013.01); *H04L 67/02* (2013.01); *H04L 67/14* (2013.01); *H04L 67/145* (2013.01); *H04L 67/22* (2013.01)

(58) Field of Classification Search
CPC .......... G06Q 30/0601; G06Q 30/0204; G06Q 30/0641; G06Q 30/0251; G06F 40/30; H04L 63/1425; H04L 67/22; H04L 67/02; H04L 67/145; H04L 67/14
See application file for complete search history.

(56) References Cited

U.S. PATENT DOCUMENTS

| | | | | |
|---|---|---|---|---|
| 7,170,993 B2* | 1/2007 | Anderson | ............ | G06Q 30/02 379/219 |
| 7,225,148 B2* | 5/2007 | Kassan | ............ | G06Q 30/0203 705/26.41 |
| 7,966,564 B2* | 6/2011 | Catlin | ............ | G06Q 30/0277 715/745 |
| 8,412,567 B2* | 4/2013 | Evevsky | ............ | G06Q 30/0207 705/14.1 |

(Continued)

OTHER PUBLICATIONS

"Getting to Know Your Website Visitors," by Paula Bernier, Customer 33. 10: 3. Technology Marketing Corporation (Dec. 2015) (Year: 2015).*

(Continued)

*Primary Examiner* — Anne M Georgalas
(74) *Attorney, Agent, or Firm* — Haynes and Boone, LLP (57) ABSTRACT

Methods and systems for creating and analyzing low-dimensional representation of webpage sequences are described. Network traffic history data associated with a particular website is retrieved and a word embedding algorithm is applied to the network traffic history data to produce a low dimensional embedding. A prediction model is created based on the low-dimensional embedding. Browsing activity on the particular website is monitored. A set of sessions in the current browsing activity is flagged based on a result of applying the prediction model to the monitored browsing activity.

20 Claims, 4 Drawing Sheets

(56) References Cited

U.S. PATENT DOCUMENTS

| | | | | |
|---|---|---|---|---|
| 8,738,732 B2* | 5/2014 | Karidi | H04L 67/22 709/218 |
| 8,762,313 B2* | 6/2014 | Lahav | G06N 5/046 706/46 |
| 8,965,998 B1* | 2/2015 | Dicker | G06Q 20/00 709/217 |
| 9,058,416 B2* | 6/2015 | Angeles | H04L 29/06 |
| 9,432,468 B2* | 8/2016 | Karidi | G06Q 30/02 |
| 10,185,975 B2* | 1/2019 | Sinha | G06Q 30/0257 |
| 10,515,400 B2* | 12/2019 | Krishnamurthy | G06Q 30/0631 |
| 10,902,499 B2* | 1/2021 | Kohli | G06Q 30/0633 |
| 2002/0070953 A1* | 6/2002 | Barg | G06Q 30/02 715/700 |
| 2007/0168465 A1* | 7/2007 | Toppenberg | G06Q 30/02 709/218 |
| 2011/0054960 A1* | 3/2011 | Bhatia | G06Q 30/02 705/7.12 |
| 2012/0116868 A1* | 5/2012 | Chin | G06Q 30/0242 705/14.43 |
| 2015/0039513 A1* | 2/2015 | Adjaoute | H04L 63/1425 705/44 |
| 2015/0278837 A1* | 10/2015 | Lahav | G06Q 30/0204 705/7.33 |
| 2016/0117726 A1* | 4/2016 | Lee | G06Q 30/0633 705/14.53 |
| 2016/0239867 A1* | 8/2016 | Sinha | G06Q 30/0255 |
| 2016/0328715 A1* | 11/2016 | Gideoni | H04L 67/22 |
| 2018/0253496 A1* | 9/2018 | Natchu | H04L 67/02 |
| 2018/0268318 A1* | 9/2018 | Matam | G06N 20/00 |

OTHER PUBLICATIONS

"Using Association Rules to Assess Purchase Probability in Online Stores," by Grazyna Suchacka and Grzegorz Chodak, Information Systems and E-Business Management, 15.3: 751-780 (Aug. 2017) (Year: 2017).*

* cited by examiner

SYSTEM AND METHOD FOR CREATING AND ANALYZING A LOW-DIMENSIONAL REPRESENTATION OF WEBPAGE SEQUENCES

TECHNICAL FIELD

The subject technology generally relates to analyzing user interaction with internet services and more particularly, relates to a more compact and efficient technique for tracking and performing analytics on the user interactions.

BACKGROUND

Over recent years, the volume of online purchases has continued to increase as consumers continue to make more and more purchases online. Payment system applications such as PayPal are often used to process payments once a sale is consummated. However, not all visits to online retailers result in a sale. In fact, a significant amount of online shopping excursions result in no purchases being made. Often times, certain friction in the shopping process discourages consumers from making purchases. For example, difficulties in registering for an account or entering payment information may be the cause of a lost sale.

Certain efficiencies may be implemented to enhance the shopping experience for consumers. In order to put such fixes in place, a determination of where the friction lies must be first made. Doing so will not only improve the shopping experience for consumers, but will also help increase sales for merchants.

SUMMARY

According to various aspects of the subject technology, a system for creating and analyzing low-dimensional representation of webpage sequences is provided. Network traffic history data associated with a particular website is retrieved and a word embedding algorithm is applied to the network traffic history data to produce a low dimensional embedding. A prediction model is created based on the low-dimensional embedding. Browsing activity on the particular website is monitored. A set of sessions in the current browsing activity is flagged based on a result of applying the prediction model to the monitored browsing activity.

According to various aspects of the subject technology, a method for creating and analyzing low-dimensional representation of webpage sequences is provided. Network traffic history data associated with a particular website is retrieved and a word embedding algorithm is applied to the network traffic history data to produce a low-dimensional embedding. A prediction model is created based on the low-dimensional embedding. Browsing activity on the particular website is monitored. Remedial action is taken in the current browsing activity based on a result of applying the prediction model to the monitored browsing activity.

According to various aspects of the subject technology, a non-transitory machine-readable medium having stored thereon machine-readable instructions executable to create and analyze low-dimensional representation of webpage sequences is provided. Network traffic history data associated with a particular website is retrieved and a word embedding algorithm is applied to the network traffic history data to produce a low-dimensional embedding. A prediction model is created based on the low-dimensional embedding. Browsing activity on the particular website is monitored. A determination as to whether remedial action is required is made based on a result of applying the prediction model to the monitored browsing activity.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In order to analyze the way users interact with services on the Internet or websites, there needs to be a manner in which different webpages visited are represented so that analytics or other types of modeling may be performed. Providing a representation of webpages for a website like www.paypal.com in a compact and tractable manner is challenging because of the sheer number of webpages within the domain, since a website like www.paypal.com is composed of hundreds of thousands of different webpages. Being able to provide such a representation, however, is crucial for leveraging the data using algorithms like machine learning algorithms.

The issue of effectively and efficiently representing a large corpus of webpages can be resolved by using the word2vec algorithm. Word2vec is a group of related models that are used to produce word embeddings. The models are shallow, two-layer neural networks that are commonly used to reconstruct linguistic contexts of words of a given language in a compact form. Word2vec takes as its input a large corpus of text and produces a vector space, typically of several hundred dimensions (e.g., 300 dimensions to represent the English vocabulary). Each unique word in the corpus is assigned a corresponding vector in the space. Word vectors are positioned in the vector space such that words that share common contexts in the corpus are located in close proximity to one another in the space.

Adapting this algorithm, word2vec may be used in a unique and unusual manner by training the model on a corpus of webpages and patterns of navigation across a variety of users, rather than training the model on words and natural language. More specifically, each webpage may be represented in a similar manner to which words are typically represented, and the vectors would represent browsing behavior as opposed to written strings of text. The corpus thus will consist of all the sequences of webpages visited during sessions, where a session is defined as all the webpages visited by a user between the times when the user connects to the website until the user exits the website. By representing the browsing behavior of users in this manner, certain metrics and analyses may then be generated based on detected patterns in order to provide guidance as to how to improve a website.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.). Furthermore, various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

Figure 1:
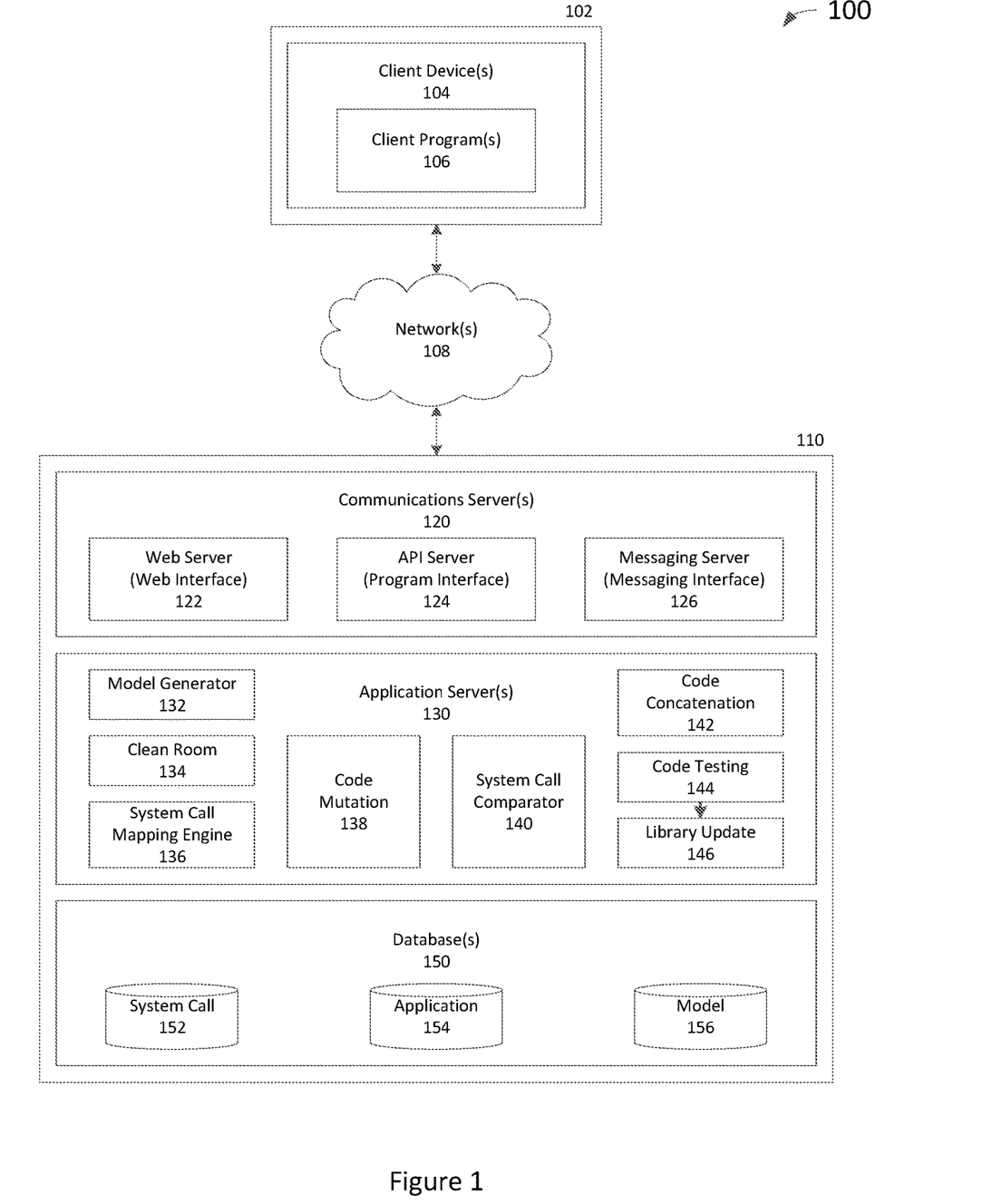
FIG. 1 is a block diagram of an exemplary computing system for creating and analyzing of a low-dimensional representation of webpage sequences.

FIG. 1 illustrates an exemplary embodiment of a computing system adapted for implementing one or more embodiments disclosed herein to create and analyze a low-dimensional representation of webpage sequences. As shown, a computing system 100 may comprise or implement a plurality of servers, devices, and/or software components that operate to perform various methodologies in accordance with the described embodiments. Exemplary servers, devices, and/or software components may include, for example, stand-alone and enterprise-class servers running an operating system (OS) such as a MICROSOFT® OS, a UNIX® OS, a LINUX® OS, or other suitable OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 100 may include, among various devices, servers, databases and other elements, one or more clients 102 comprising or employing one or more client devices 104, such as a laptop, a mobile computing device, a tablet, a personal computer, a wearable device, and/or any other computing device having computing and/or communications capabilities in accordance with the described embodiments. Client devices 104 may include a cellular telephone, smart phone, electronic wearable device (e.g., smart watch, virtual reality headset), or other similar mobile devices that a user may carry on or about his or her person and access readily.

Client devices 104 generally may provide one or more client programs 106, such as system programs and application programs to perform various computing and/or communications operations. Exemplary system programs may include, without limitation, an operating system (e.g., MICROSOFT® OS, UNIX® OS, LINUX® OS, Symbian OS™, iOS, Android, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a payment system application, a web browser application, messaging application, contacts application, calendar application, electronic document application, database application, media application (e.g., music, video, television), location-based services (LBS) application (e.g., GPS, mapping, directions, positioning systems, geolocation, point-of-interest, locator) that may utilize hardware components such as an antenna, and so forth. One or more of client programs 106 may display various graphical user interfaces (GUIs) to present information to and/or receive information from one or more users of client devices 104. In some embodiments, client programs 106 may include one or more applications configured to conduct some or all of the functionalities and/or processes discussed below.

As shown, client devices 104 may be communicatively coupled via one or more networks 108 to a network-based system 110. Network-based system 110 may be structured, arranged, and/or configured to allow client 102 to establish one or more communications sessions between network-based system 110 and various client devices 104 and/or client programs 106. Accordingly, a communications session between client devices 104 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data communications between client devices 104 and the network-based system 110 may be sent and received over one or more networks 108 such as the Internet, a WAN, a WWAN, a WLAN, a mobile telephone network, a landline telephone network, personal area network, as well as other suitable networks. For example, client devices 104 may communicate with network-based system 110 over the Internet or other suitable WAN by sending and or receiving information via interaction with a website, e-mail, IM session, and/or video messaging session. Any of a wide variety of suitable communication types between client devices 104 and system 110 may take place, as will be readily appreciated. In particular, wireless communications of any suitable form (e.g., Bluetooth, near-field communication, etc.) may take place between client device 104 and system 110, such as that which often occurs in the case of mobile phones or other personal and/or mobile devices.

Network-based system 110 may comprise one or more communications servers 120 to provide suitable interfaces that enable communication using various modes of communication and/or via one or more networks 108. Communications servers 120 may include a web server 122, an API server 124, and/or a messaging server 126 to provide interfaces to one or more application servers 130. Application servers 130 of network-based system 110 may be structured, arranged, and/or configured to provide various online services to client devices that communicate with network-based system 110. In various embodiments, client devices 104 may communicate with application servers 130 of network-based system 110 via one or more of a web interface provided by web server 122, a programmatic interface provided by API server 124, and/or a messaging interface provided by messaging server 126. It may be appreciated that web server 122, API server 124, and messaging server 126 may be structured, arranged, and/or configured to communicate with various types of client devices 104, and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, mobile applications, and so forth. API server 124 may be arranged to communicate with various client programs 106 comprising an implementation of API for network-based system 110. Messaging server 126 may be arranged to communicate with various messaging clients and/or applications such as e-mail, IM, SMS, MMS, telephone, VoIP, video messaging, IRC, and so forth, and messaging server 126 may provide a messaging interface to enable access by client 102 to the various services and functions provided by application servers 130.

Application servers 130 of network-based system 110 may be servers that provide various services to client devices, such as tools for authenticating users and associated libraries. Application servers 130 may include multiple servers and/or components. For example, application servers 130 may include a model generator 132, clean room 134, system call mapping engine 136, code mutation engine 138, system call comparison engine 140, code concatenation engine 142, testing engine 144, and/or library update engine 146. These servers and/or components, which may be in addition to other servers, may be structured and arranged to identify those webpages that malicious content.

Application servers 130, in turn, may be coupled to and capable of accessing one or more databases 150 including system call database 152, application database 154, and/or model database 156. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
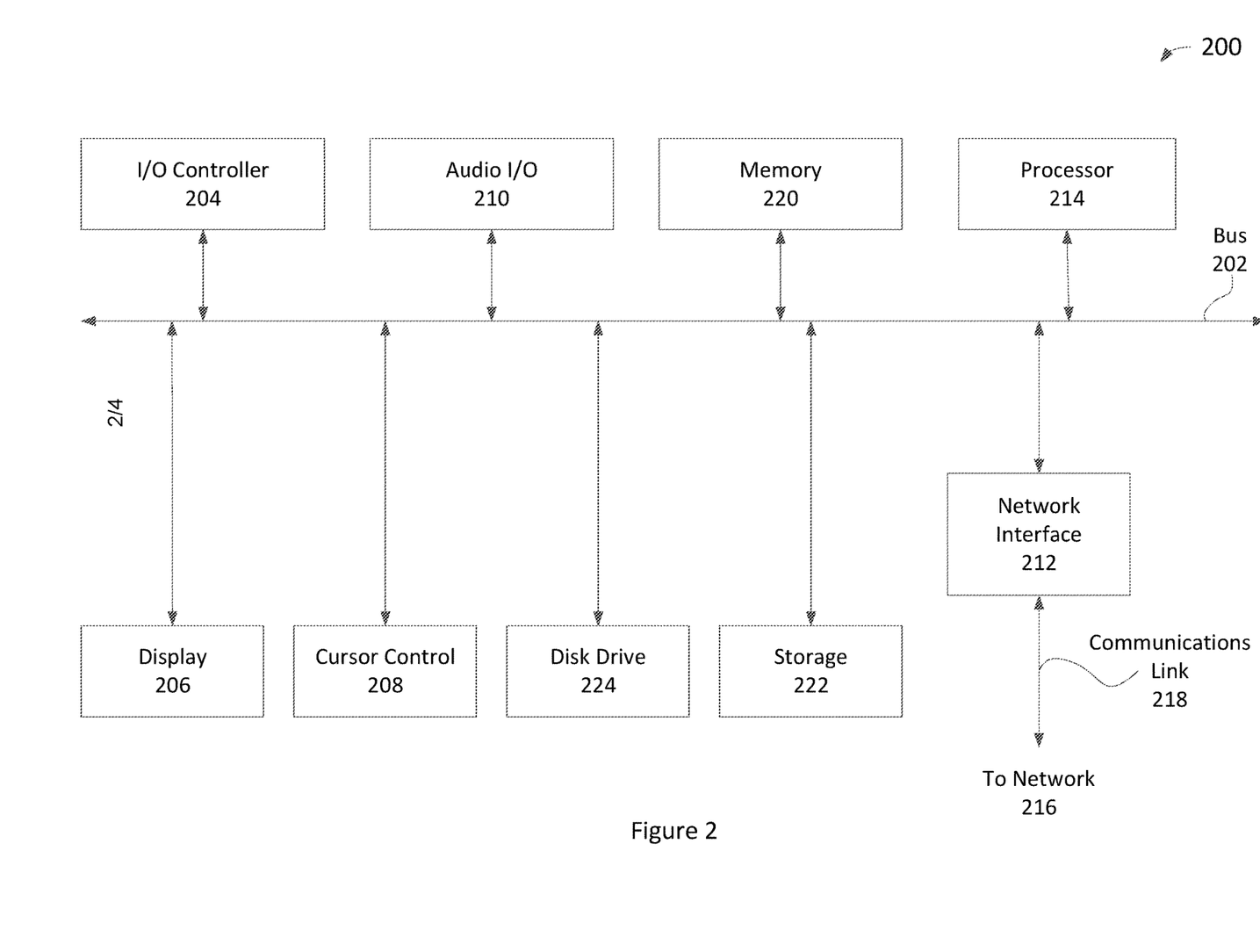
FIG. 2 is a block diagram of an exemplary computer system suitable for implementing one or more devices of the computing system in FIG. 1.

FIG. 2 illustrates an exemplary computer system 200 in block diagram format suitable for implementing on one or more devices of the computing system in FIG. 1. In various implementations, a device that includes computer system 200 may comprise a personal computing device (e.g., a smart or mobile phone, a computing tablet, a personal computer, laptop, wearable device, PDA, etc.) that is capable of communicating with a network. A service provider and/or a content provider may utilize a network computing device (e.g., a network server) capable of communicating with the network. It should be appreciated that each of the devices utilized by users, service providers, and content providers may be implemented as computer system 200 in a manner as follows. Additionally, as more and more devices become communication capable, such as smart devices using wireless communication to report, track, message, relay information and so forth, these devices may be part of computer system 200.

Computer system 200 may include a bus 202 or other communication mechanisms for communicating information data, signals, and information between various components of computer system 200. Components include an input/output (I/O) controller 204 that processes a user action, such as selecting keys from a keypad/keyboard, selecting one or more buttons, links, actuatable elements, etc., and sends a corresponding signal to bus 202. I/O controller 204 may also include an output component, such as a display 206 and a cursor control 208 (such as a keyboard, keypad, mouse, touchscreen, etc.). In some examples, I/O controller 204 may include an image sensor for capturing images and/or video, such as a complementary metal-oxide semiconductor (CMOS) image sensor, and/or the like. An audio I/O component 210 may also be included to allow a user to use voice for inputting information by converting audio signals. Audio I/O component 210 may allow the user to hear audio.

A transceiver or network interface 212 transmits and receives signals between computer system 200 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 214, which may be a micro-controller, digital signal processor (DSP), or other processing component, processes these various signals, such as for display on computer system 200 or transmission to other devices over a network 216 via a communication link 218. Again, communication link 218 may be a wireless communication in some embodiments. Processor 214 may also control transmission of information, such as cookies, IP addresses, images, and/or the like to other devices.

Components of computer system 200 also include a system memory 220 (e.g., RAM), a static storage component 222 (e.g., ROM), and/or a disk drive 224. Computer system 200 performs specific operations by processor 214 and other components by executing one or more sequences of instructions contained in system memory 220. Logic may be encoded in a computer-readable medium, which may refer to any medium that participates in providing instructions to processor 214 for execution. Such a medium may take many forms, including but not limited to, non-volatile media, volatile media, and/or transmission media. In various implementations, non-volatile media includes optical or magnetic disks, volatile media includes dynamic memory such as system memory 220, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer-readable media. It is also contemplated that software identified herein may be implemented using one or more computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

Machine learning algorithms typically require the data used to be represented numerically. Databases containing a history of all webpages visited is no exception. Specifically, when browsing sessions are broken down to the event-level—e.g., all the different webpages of www.paypal.com that the user visits, including login, check account details, bank transfer, etc.—the data ends up being massive and thus very high-dimensional. The hundreds of thousands of different events/webpages associated with www.paypal.com could potentially result in as many dimensions. Thus, an algorithm that attempts to leverage the history of all webpages visited would need to produce an accurate and compact representation of the data. Applying the word2vec algorithm, which is commonly used for natural language processing (NLP), to webpage representation, a system can provide a manner in which the history of all webpages visited may be efficiently organized in a compact representation, and subsequently leveraged to produce useful predictions and reports.

Figure 3:
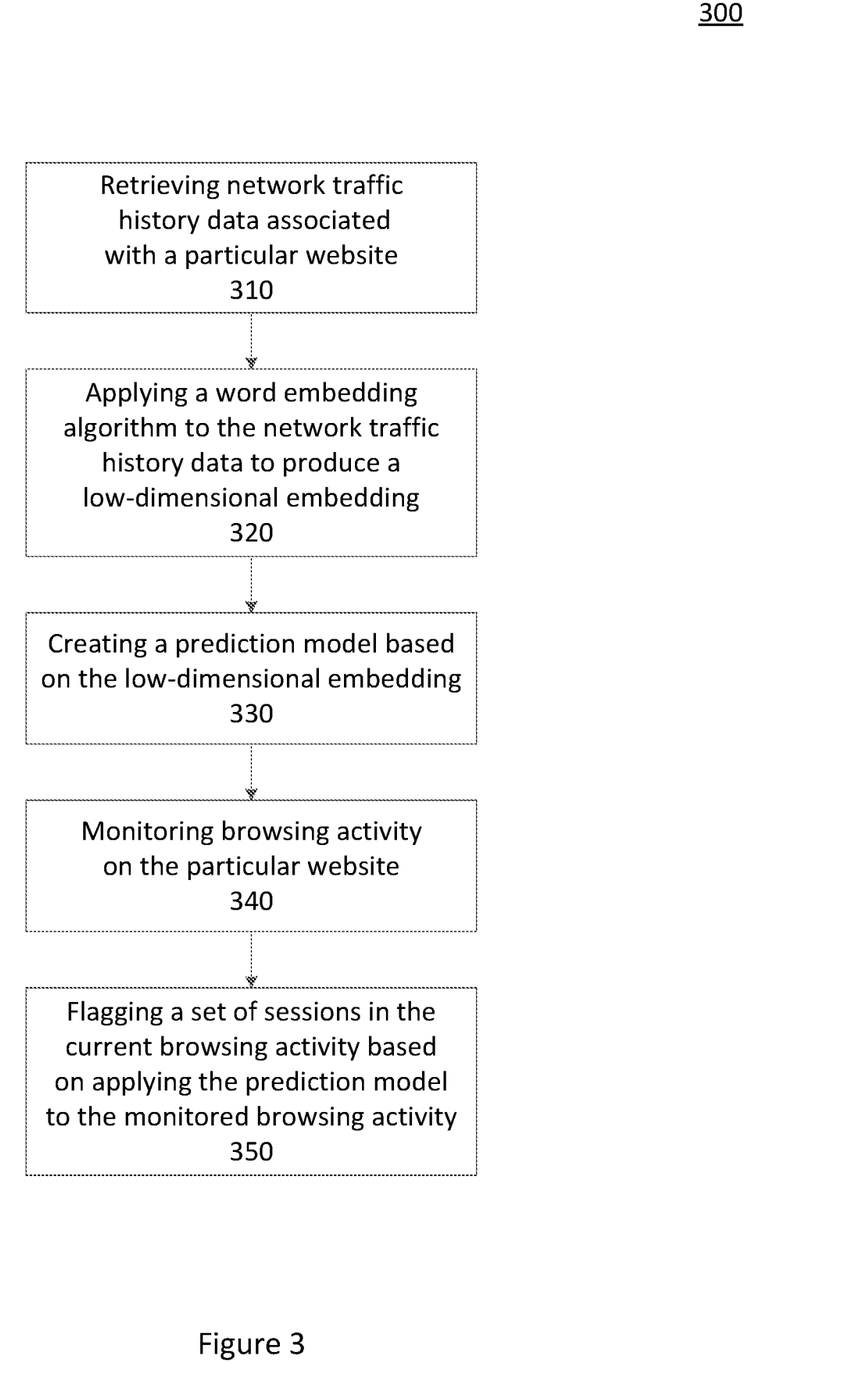
FIG. 3 is a flow diagram illustrating an exemplary process for creating and analyzing of a low-dimensional representation of webpage sequences.

FIG. 3 is a flow diagram illustrating an exemplary process for creating and analyzing of a low-dimensional representation of webpage sequences. In step 310, historical data of network traffic for a particular website is retrieved by the system. For example, data representing all the network traffic for each individual user on a particular merchant website may be obtained. This data includes information such as browsing history for all users that have browsed the merchant website. Included in this data is all the webpages visited by each user, and the sequence/order in which the webpages are visited by the users. For example, one user may navigate the merchant website in one manner that consummates in a purchase, whereas another user navigates through the merchant website in another manner and abandons the shopping cart. Such information, when amassed in large quantities, can prove extremely useful to the merchant if organized and analyzed in an intelligent manner.

In step 320, the system applies a word embedding algorithm, such as word2vec, to the retrieved network traffic history data to produce a low-dimensional embedding. As discussed above, word2vec is a shallow word embedding model that, in this instance, learns to map each discrete webpage of the merchant website into a low-dimensional continuous vector-space based on distributional properties observed from the corpus (i.e., historical data of network traffic). When applied to a language, word2vec produces low-dimensional representations that capture relationships between words of a corpus to highlight linguistic regularities. That is, the statistics of how often some word co-occurs with neighboring words in a large text corpus are computed and then mapped to a vector for each word. Once a low-dimensional embedding has been produced, predictive models can then be formulated based on the embedding. The predictive models may, for example, predict a word from its neighbors. Word2vec typically utilizes two model architectures—the continuous bag of words (CBOW) and the skip-gram models. While the two models are algorithmically similar, CBOW is used to predict target words from source context words while the skip-gram does the inverse and predicts source context-words from the target words.

Applying word2vec to browsing history of a website produces the unique low-dimensional representations that capture browsing regularities. Webpage vectors are positioned in the vector space in a manner such that webpages sharing common contexts in the corpus are located in close proximity to one another in the space. Once a low-dimensional embedding has been produced, predictive models can then be created in step 330 based on the embedding. That is, certain metrics may be determined based on the different clusters of vectors. For example, a group of vectors in the vector space that are known to be associated with sales may be identified. Likewise, a group of vectors in the vector space that are known to be associated with abandoned shopping carts may also be identified. Once identified, the system can determine what types of browsing activities are likely to produce which final dispositions. In other words, the webpage vectors of the low-dimensional embedding may be used to produce a prediction model that anticipates the webpage that the user is likely to navigate to next in an active browsing session.

In step 340, current browsing activity on the particular website are monitored. For example, the system continuously monitors the browsing activity engaged in by users on the merchant website. As indicated above, the monitoring includes identifying webpages visited by each user, and identifying the sequence/order in which the webpages are visited. In monitoring the browsing sessions, a determination of whether one or more sessions of the browsing activity should be flagged is made in step 350. This determination is made based on applying the prediction model to the monitored browsing activity. Since the prediction model is founded on historical network traffic data, any current browsing session that appears to have a similar pattern as a previously analyzed session of interest (according to the prediction model) may be flagged.

For instance, if the first few pages of a current browsing session mimics a part of a previously analyzed session, then it may be predicted that the results (i.e., the likelihood of the user to make a purchase) will be similar. Thus, if the analysis based on the prediction of the webpage vectors suggests that the current browsing session will likely result in an abandoned shopping cart on the merchant's website, the session may be flagged so that interventional steps may be taken. In some embodiments, a chat session may be initiated to salvage the session assist the user with a potential purchase. Alternatively, a discount (e.g., free shipping, percentage off, dollar amount off, etc.) may be offered to encourage the user to complete a purchase in a shopping session that the user may otherwise abandon.

In certain dynamic systems, the configuration of a webpage on a merchant website may be altered based on the prediction model. For example, if a navigation sequence of webpage1→webpage2→webpage3 typically leads to no sale being made, but a navigation sequence of webpage1→webpage2→webpage4 usually leads to a sale, then the system may alter the layout of webpage2 such that the hyperlink to webpage4 becomes more prominent when webpage2 is presented to the user that navigates from webpage1.

In some embodiments, a cluster of webpage vectors may be associated with account take overs (ATOs) by bad actors. For example, certain bad actors may be privy to the same information about how to hack a user's account. Thus, if bad actors employ the same or similar techniques for hacking into accounts, then the browsing sequence history will produce the cluster of webpage vectors in the vector space where each vector represents an instance of hacking. As such, the system, by monitoring browsing activity, may detect certain patterns of browsing activity that suggests a hack (e.g., and ATO) is about to ensue, and may flag the browsing session or even engage in remedial measures to prevent the hack from being completed.

In some embodiments, a feedback loop may be provided to the system, particularly when newly identified browsing sessions are introduced. For example, new browsing sessions may include additional information that becomes part of the corpus on which the prediction model is built via word2vec. As such, as new browsing sessions are recorded into browsing history, the corpus grows and the prediction model, with increased training data set, becomes more accurate.

Figure 4:
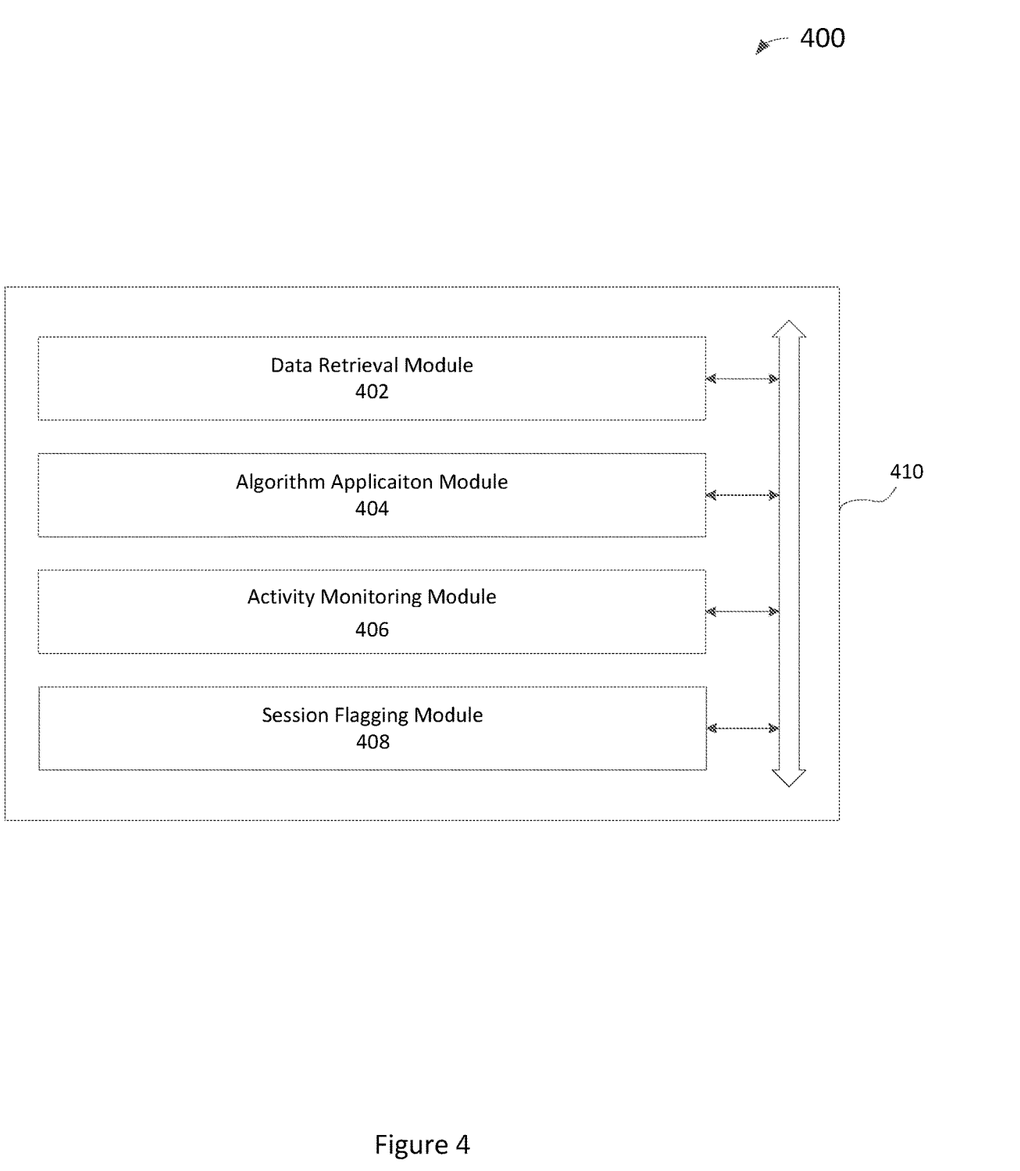
FIG. 4 illustrates an example of components of the system for creating and analyzing of a low-dimensional representation of webpage sequences.

FIG. 4 provides an illustration of components of the system for creating and analyzing of a low-dimensional representation of webpage sequences, in accordance with various aspects of the subject technology. System 400 comprises data retrieval module 402, algorithm application module 404, activity monitoring module 406 and session flagging module 408. These modules may be in communication with one another via bus 410. In some aspects, the modules may be implemented in software (e.g., subroutines and code). The software implementation of the modules may operate on a client device 104 application that is running a specific language compatible to the modules. In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Data retrieval module 402 is used to retrieve historical data of network traffic for a particular website. As discussed above, data representing all network traffic on a particular merchant website may be obtained. This data includes information such as browsing history for each of the many users that have browsed the merchant website. Included in this retrieved data is all the webpages visited by each user, and the sequence/order in which the webpages are visited by the users.

System 400 further comprises an algorithm application module 404 configured to apply word2vec to a corpus, which in this case is the retrieved network traffic history data. By applying word2vec, a prediction model may be generated. The prediction model is then used against browsing activity that's being monitored by way of the activity monitoring module 406. Depending on the result generated using the prediction model against a current browsing activity, a set of sessions in the current browsing activity may be flagged by session flagging module 408. As discussed above, the system will flag sessions that are of interest (e.g., sessions that are predicted to result in a sale and sessions that are predicted to result in an abandoned shopping cart). Based on the flag that's been raised, remedial action may be taken.

System 400 is particularly useful for analyzing the way users interact with a particular service or website, and does so by representing the corpus of different webpages visited in a manner in which analytics and other types of modeling may be performed. Using word2vec, system 400 is able to efficiently process and represent the corpus in a multi-dimensional vector space. The representation, which are presented as vectors, are then used to predict "next steps" within a browsing session. Such prediction are useful to help merchants gain additional understanding of their client base.

The user device (i.e., the computing device) described above may be one of a variety of devices including but not limited to a smartphone, a tablet, a laptop and a pair of augmented reality spectacles. Each of these devices embodies some processing capabilities and an ability to connect to a network (e.g., the internet, a LAN, a WAN, etc.). Each device also includes a display element for displaying a variety of information. The combination of these features (display element, processing capabilities and connectivity) on the mobile communications enables a user to perform a variety of essential and useful functions.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "implementation" does not imply that such implementation is essential to the subject technology or that such implementation applies to all configurations of the subject technology. A disclosure relating to an implementation may apply to all implementations, or one or more implementations. An implementation may provide one or more examples of the disclosure. A phrase such an "implementation" may refer to one or more implementations and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the terms "include," "have," and "the like" are used in the description or the claims, such terms are intended to be inclusive in a manner similar to the term "comprise" as "comprise" is interpreted when employed as a transitional word in a claim.

The word "exemplary" is used herein to mean "serving as an example, instance, or illustration." Any implementation described herein as "exemplary" is not necessarily to be construed as preferred or advantageous over other implementations.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A system comprising:
   a non-transitory memory storing instructions; and
   one or more hardware processors coupled to the non-transitory memory and configured to read the instructions from the non-transitory memory to cause the system to perform operations comprising:
   retrieving network traffic history data associated with a website that contains a plurality of webpages and has been visited by a plurality of users;
   applying a word embedding algorithm to the network traffic history data of the plurality of users by representing the plurality of webpages as words, by representing user browsing behavior on the plurality of webpages as vectors;
   producing, based on the applying of the word embedding algorithm, a low-dimensional representation of browsing behavior, the low-dimensional representation of browsing behavior associating an abandoned transaction with a first type of user browsing behavior or with a first set of navigation paths of the plurality of webpages and associating a completed transaction with a second type of user browsing behavior or with a second set of navigation paths of the plurality of webpages;
   predicting, based on the low-dimensional representation of browsing behavior, a future action of one or more of the users with respect to the website at least in part by identifying a first group of vectors corresponding to the abandoned transaction or by identifying a second group of vectors corresponding to the completed transaction;
   monitoring a current browsing activity of the one or more of the users on the website; and
   flagging a set of sessions in the monitored current browsing activity based on the predicted future action and the monitored current browsing activity.

2. The system of claim 1, wherein the word embedding algorithm comprises a word2vec algorithm.

3. The system of claim 1, wherein flagging the set of sessions in the current browsing activity comprises using the predicted future action and the monitored current browsing activity to determine whether the current browsing activity corresponds with the abandoned transaction, and wherein the operations further comprise: taking a remedial action in real time with respect to the current browsing activity in response to a determination that the current browsing activity corresponds with the abandoned transaction.

4. The system of claim 1, wherein the website is a merchant website.

5. The system of claim 4, wherein the abandoned transaction comprises a time-expired browsing session resulting in an abandoned shopping cart on the merchant website.

6. The system of claim 1, wherein the low-dimensional representation of browsing behavior further associates a fraudulent activity with a third type of user browsing behavior or with a third set of navigational paths of the plurality of webpages.

7. The system of claim 1, wherein the network traffic history data comprises a sequence in which the plurality of webpages are visited by each user of the plurality of users.

8. The system of claim 1, wherein the operations further comprise: adding the monitored browsing activity to the network traffic history data after the monitoring.

9. A method comprising:
   retrieving network traffic history data associated with a website that contains a plurality of webpages and has been visited by a plurality of users;
   applying a word embedding algorithm to the network traffic history data of the plurality of users by representing the plurality of webpages as words, by representing user browsing behavior on the plurality of webpages as vectors;
   producing, based on the applying of the word embedding algorithm, a low-dimensional representation of browsing behavior, the low-dimensional representation of browsing behavior associating an abandoned transaction with a first type of user browsing behavior or with a first set of navigation paths of the plurality of webpages and associating
   a completed transaction with a second type of user browsing behavior or with a second set of navigation paths of the plurality of webpages;

predicting, based on the low-dimensional representation of browsing behavior, a future action of one or more of the users with respect to the website at least in part by identifying a first group of vectors corresponding to the abandoned transaction or by identifying a second group of vectors corresponding to the completed transaction;

monitoring a current browsing activity on the website; and taking an action based on the predicted future action and the monitored current browsing activity.

10. The method of claim 9, wherein the word embedding algorithm comprises a word2vec algorithm.

11. The method of claim 9, wherein the action comprises reconfiguring content of a webpage of the plurality of webpages on the website.

12. The method of claim 11, wherein the reconfiguring the content of the webpage comprises promoting one or more hyperlinks to a higher than original location on the webpage.

13. The method of claim 9, wherein the low-dimensional representation of browsing behavior associates a fraudulent activity with a third type of user browsing behavior or with a third set of navigation paths of the plurality of webpages, and wherein the method further comprises: determining, based on the predicted future action and the monitored current browsing activity, that the fraudulent activity against a user accounts is to occur within a predefined period of time, and wherein the taking the action comprises preventing an occurrence of the fraudulent activity.

14. The method of claim 9, wherein the website is a merchant website.

15. The method of claim 9, wherein the predicting comprises predicting that, absent taking the action, the monitored current browsing activity will result in an account takeover of the user account.

16. The method of claim 9, wherein the taking the action comprises presenting a discount usable on the website.

17. The method of claim 9, wherein the network traffic history data comprises a sequence in which the plurality of webpages are visited by each user of the plurality of users.

18. A non-transitory machine-readable medium having stored thereon machine-readable instructions executable to cause performance of operations comprising:

retrieving network traffic history data associated with a website that contains a plurality of webpages and has been visited by a plurality of users;

applying a word embedding algorithm to the network traffic history data of the plurality of users by representing the plurality of webpages as words, by representing user browsing behavior on the plurality of webpages as vectors;

producing, based on the applying of the word embedding algorithm, a low-dimensional representation of browsing behavior, the low-dimensional representation of browsing behavior associating an abandoned transaction with a first type of user browsing behavior or with a first set of navigation paths of the plurality of webpages and associating a completed transaction with a second type of user browsing behavior or with a second set of navigation paths of the plurality of webpages;

predicting, based on the low-dimensional representation of browsing behavior, future action of one or more of the users with respect to the website at least in part by identifying a first group of vectors corresponding to the abandoned transaction or by identifying a second group of vectors corresponding to the completed transaction;

monitoring a current browsing activity on the website; and taking a remedial action with respect to the monitored current browsing activity in response to a determination that the monitored current browsing activity corresponds with the abandoned transaction.

19. The non-transitory machine-readable medium of claim 18, wherein the word embedding algorithm comprises a word2vec algorithm.

20. The non-transitory machine-readable medium of claim 18, wherein the operations further comprise: taking the action in the monitored current browsing activity at least in part by reconfiguring a content of a webpage of the plurality of webpages or presenting a discount usable on the web site.

* * * * *